United States Patent [19]
Chandrasekar

[11] Patent Number: 5,921,731
[45] Date of Patent: Jul. 13, 1999

[54] HIGH SPEED HYDROSTATIC SPINDLE

[75] Inventor: Kugalur S. Chandrasekar, Rockford, Ill.

[73] Assignee: The Ingersoll Milling Machine Company, Rockford, Ill.

[21] Appl. No.: 08/889,739

[22] Filed: Jul. 10, 1997

Related U.S. Application Data

[60] Provisional application No. 60/034,806, Dec. 31, 1996.

[51] Int. Cl.$^6$ ..................................... B23C 1/00
[52] U.S. Cl. ........................... 409/231; 384/110; 408/124
[58] Field of Search ..................... 384/110, 119, 384/131, 132, 144; 409/231, 232, 233, 135; 408/124

[56] References Cited

U.S. PATENT DOCUMENTS

| | | | |
|---|---|---|---|
| 3,717,392 | 2/1973 | Ennis | 308/5 R |
| 3,753,604 | 8/1973 | Arsenius | 384/110 |
| 3,754,800 | 8/1973 | Johansson | 384/110 |
| 3,781,069 | 12/1973 | Gluchowicz | 308/5 R |
| 3,834,775 | 9/1974 | Tuffias et al. | 308/36.3 |
| 3,843,952 | 10/1974 | Huson | 308/172.5 |
| 3,891,282 | 6/1975 | Tuffias | 308/9 |
| 3,891,283 | 6/1975 | Pruvot | 308/5 AR |
| 3,917,366 | 11/1975 | Mason | 384/110 |
| 3,934,948 | 1/1976 | Pruvot | 308/9 |
| 3,945,692 | 3/1976 | Tsujiuchi | 308/9 |
| 4,090,743 | 5/1978 | Suzuki et al. | 308/9 |
| 4,114,959 | 9/1978 | Christ | 308/3.5 |
| 4,185,878 | 1/1980 | Robert | 308/9 |
| 4,232,913 | 11/1980 | Nilsson | 308/9 |
| 4,277,114 | 7/1981 | Lindegger | 384/144 |
| 4,285,551 | 8/1981 | Suzuki et al. | 308/9 |
| 4,302,060 | 11/1981 | Nicholas et al. | 308/9 |
| 4,320,926 | 3/1982 | Heinemann et al. | 308/9 |
| 4,322,116 | 3/1982 | Heinemann et al. | 308/9 |
| 4,325,585 | 4/1982 | Sugita | 308/9 |
| 4,371,216 | 2/1983 | Suzuki et al. | 384/118 |
| 4,382,199 | 5/1983 | Isaacson | 310/87 |
| 4,392,642 | 7/1983 | Chitayat | 269/73 |

(List continued on next page.)

FOREIGN PATENT DOCUMENTS

| | | |
|---|---|---|
| 0 533 526A1 | 8/1993 | European Pat. Off. . |
| 2 507 265 | 12/1982 | France . |
| 1 362 976 | 8/1974 | United Kingdom . |

*Primary Examiner*—Andrea L. Pitts
*Assistant Examiner*—Adesh Bhargava
*Attorney, Agent, or Firm*—Fitch, Even, Tabin & Flannery

[57] ABSTRACT

An integrated spindle and motor unit includes a housing containing both the spindle shaft and motor with hydrostatic bearings around the front and rear of the spindle shaft. The hydrostatic bearings utilize high pressure oil, preferably in the range of 1,200–1,500 psi and provide good load bearing capacity and increased stiffness for improved cutting accuracy when cutting within the full range of cutting speeds. The present spindle unit is designed to be run at high speeds. The front and rear hydrostatic bearing pads are closely axially spaced along the spindle shaft so that the dynamic stiffness of the spindle is increased to avoid resonant vibrations even at high speed operation thereof. The spindle unit incorporates a sealing system utilizing a series of non-contacting seals including a labyrinth seal and aerostatic floating ring seals which keeps bearing oil in the spindle. The aerostatic ring seals have air restrictor openings therein to create an aerostatic air film that also keeps the rings concentric with the spindle shaft even though the spindle shaft is tilted in a nutator. A permanent magnet (PM) motor is integrated with the spindle with the rotor of the motor on the spindle shaft carrying the permanent magnets rotating within the stator of the motor which is attached in the spindle housing. The PM motor herein can provide high levels of power, e.g., at least 100 hp at the tool head, even in the short span provided by the short spindle shaft. At high speeds the bearing fluid may be pumped by viscous pumping from the radial bearing pockets. To counter such viscous pumping, small low pressure pockets are provided with low pressure oil to fill the high pressure pockets with oil.

32 Claims, 7 Drawing Sheets

U.S. PATENT DOCUMENTS

| | | | |
|---|---|---|---|
| 4,474,483 | 10/1984 | Suzuki et al. | 384/114 |
| 4,490,054 | 12/1984 | Kimmelaar | 384/117 |
| 4,538,081 | 8/1985 | Kamiya et al. | 310/90 |
| 4,571,799 | 2/1986 | Chitayat | 29/149.5 A |
| 4,628,238 | 12/1986 | Smulders et al. | 318/653 |
| 4,693,642 | 9/1987 | Mair et al. | 408/59 |
| 4,712,031 | 12/1987 | Anderson | 310/90 |
| 4,797,990 | 1/1989 | Yamaguchi et al. | 29/568 |
| 4,797,991 | 1/1989 | Yamaguchi et al. | 29/568 |
| 4,834,559 | 5/1989 | Kalvoda | 384/118 |
| 4,869,626 | 9/1989 | Kosmowski | 408/124 |
| 4,919,547 | 4/1990 | Schwartzman | 384/110 |
| 4,919,549 | 4/1990 | Lawson et al. | 384/119 |
| 4,927,304 | 5/1990 | Hauser | 409/231 |
| 4,930,910 | 6/1990 | Mori et al. | 384/276 |
| 4,998,033 | 3/1991 | Hisabe et al. | 310/67 R |
| 5,010,794 | 4/1991 | Klager | 82/147 |
| 5,014,581 | 5/1991 | Komanduri et al. | 82/173 |
| 5,022,769 | 6/1991 | Jacobs et al. | 384/118 |
| 5,057,723 | 10/1991 | Umehara et al. | 310/12 |
| 5,089,732 | 2/1992 | Konno et al. | 310/67 R |
| 5,104,237 | 4/1992 | Slocum | 384/12 |
| 5,106,204 | 4/1992 | Dunham | 384/12 |
| 5,140,739 | 8/1992 | Yamaguchi et al. | 483/18 |
| 5,142,173 | 8/1992 | Konno et al. | 310/67 R |
| 5,145,298 | 9/1992 | Marantette | 409/232 |
| 5,244,286 | 9/1993 | Chang | 384/118 |
| 5,281,032 | 1/1994 | Slocum | 384/118 |
| 5,322,494 | 6/1994 | Holtey et al. | 483/12 |
| 5,356,225 | 10/1994 | Hanes et al. | 384/100 |
| 5,419,223 | 5/1995 | Kubler et al. | 82/118 |
| 5,448,120 | 9/1995 | Schaule et al. | 310/90 |
| 5,449,236 | 9/1995 | Hori et al. | 384/118 |
| 5,462,364 | 10/1995 | Chandrasekar et al. | 384/111 |
| 5,466,071 | 11/1995 | Slocum | 384/118 |
| 5,484,208 | 1/1996 | Kane et al. | 384/12 |
| 5,488,771 | 2/1996 | Devitt et al. | 29/898.02 |
| 5,714,817 | 2/1998 | Norris | 384/144 |

HIGH SPEED HYDROSTATIC SPINDLE

Cross-Reference to Related Application

This application is a Continuation-in-Part of Provisional Patent Application No. 60/034,806, filed Dec. 31, 1996.

FIELD OF THE INVENTION

The invention relates to a compact spindle and motor unit for a machine tool for cutting of workpieces at high rotary speeds in an accurate manner.

BACKGROUND OF THE INVENTION

In machine tool cutting it is generally desirable that the tool have high spindle rotary speed and power capabilities as in many applications use of the increased available power and higher cutting speeds can provide improved cutting results in terms of the finish and accuracy of the cut workpiece surfaces and the rate of stock removal and machine cycling times. For example, heavy roughing cuts can be performed to maximize the rate of metal removal such as in milling or boring operations, and the resulting rough finish and dimensional variation can be corrected by light finishing cuts. Each of these operations will require that such things as the tool speed, feed rates and depth of cut be carefully selected for minimizing cycle times to improve productivity keeping in mind the rigidity or stiffness of the spindle of the machine and the spindle power limitations on available horsepower.

Typically, the motors for these spindles are induction-type motors which drive a shaft of the spindle carrying a cutting tool with the shaft being supported for rotary motion by bearings. The spindle shaft can be driven by the motor drive shaft with power being transmitted by way of the belts and/or gears of the motor with the tool thus being coupled through the spindle shaft and the motor power transmission gear train to the drive shaft of the motor. Power requirements for machining are proportional to speed and cutting force, and the power lost in bearings and gears of the machine increases with speed. Spindle motor horsepower rating must be considered when selecting a tool because power consumption is in direct relation to the rate of metal removal, which in turn is related to production rates. To minimize the number of cuts required, the depth of cuts should be as great as is possible within the limits of the power of the machine tool and the amount of stock to be removed. As depth of cut increases, the cutting force at the tool head becomes larger. Thus, where relatively deep cuts are desired, a large amount of horsepower may be required. In addition, particular types of machining operations and workpiece materials may dictate certain power requirements such as in tapping of steel where the spindle has to run fairly slowly yet still be capable of providing sufficient torque for cutting. Spindles in many current machine tools have induction motors with limited power capabilities so that cutting forces must be limited to a value that will not overload the machine.

Generally in any machining operation, the power requirement is directly proportional to the material removal rate. The spindle speed is governed by the optimum cutting velocity for that particular workpiece material and tool material combination. The "chip load" is another important factor which influences the tool life. It is established by the spindle speed (rpm) and the feed rate. Hence, in order to maintain an optimum chip load and an optimum cutting velocity for a given power availability at the tool, the depth of cut is the only variable that can be changed. This directly influences the machine time.

For conventional milling operations, depth of cut can be, for example, on the order of 0.250 inches for roughing and 0.025 inches or less for finishing. In milling of aluminum alloys such as for aircraft components, faster and deeper cuts are commonly desired to improve productivity. Depth of cuts several times greater than normal such as on the order of half an inch or greater require greater power capabilities than are provided in many conventional machine tools. As to cutting speeds for aluminum alloys, this is determined by the limits of the machine tool and also by the workpiece. Generally, aluminum can be readily cut at a wide range of speeds. However, as the coefficient of thermal expansion of aluminum alloys can be higher than that of most metals commonly machined, the dimensional accuracy of finished parts requires that the part be kept cool during machining. High cutting speed helps keep the part cool, because most of the heat introduced into the part during a given rotation is removed with the chip during the next rotation, and the time for diffusion of the heat into the part is short. In addition, high speeds will generally yield a high rate of metal removal and produce the best finish. Thus, if the aluminum part to be cut can take high speed cutting, this is generally desirable. However, mainly because of limitations imposed by available spindle speed and horsepower, very high speed cutting operations are not commonly done on aluminum parts. Thus, a machine tool having a spindle capable of producing deep cuts and fast speeds is desirable, particularly for minimizing temperature rise in aluminum parts during machining thereof.

Spindle stiffness has a marked effect on the maximum speed that will not cause chatter. Chatter is a condition in which the machine tool cutter vibrates in resonance at a frequency determined by the natural frequency of the spindle shaft. In other words, spindles have their own characteristic or critical speed at which vibrations get very high. Spindles cannot be operated at their critical speed as otherwise harmonic vibration can occur. Chatter as caused by resonant or harmonic vibrations adversely affects machining accuracy in terms of tolerances and part finish. In addition, the stiffness of a spindle shaft is a significant factor in the amount of deflection caused by cutting forces. Tool deflection and chatter resulting from lack of spindle rigidity can cause excessive tool wear and breakage, damage to workpieces, dimensional inaccuracy and unacceptable surface finish.

Current spindles used for high speed cutting operations can be relatively large and have unfavorable length to diameter ratios, and the spindle design and the bearings therefor generally cannot provide for the desired stiffness especially as the bearing surfaces start to wear or fatigue creating pitting in these surfaces due to the high frequency vibrations and extreme load bearing conditions which can be generated at high speeds. To avoid the onset of resonant vibrations in these spindle units, lower spindle speeds are typically employed. However, in some instances for example, it may be desirable to cut at high speeds with lighter feeds to improve the part finish. Stiff spindles are necessary when low-micro-inch finishes must be achieved. Thus, it is desirable to design machine tools with stiff spindles to avoid the onset of resonant vibrations causing chatter to minimize or eliminate the problems resulting from high frequency vibrations and chatter thereby increasing production and lowering production costs. The increased speed possible with a stiff spindle design can improve finishes and increase production rates.

For machine tools, due to the considerable number of parts constituting the bearings, it is extremely difficult to provide high speed spindles with rolling-contact bearings affording a high degree of machining precision and yielding very satisfactory surface conditions. The use of conventional bearings such as roller or ball bearings for supporting the loads taken by the spindle shaft, particularly in high speed applications, can cause problems with accuracy as they fatigue under the high centrifugal forces and the extreme friction, heat and load bearing conditions which can be generated at high speeds. In addition, the life of these contacting bearings under a given load is typically a certain number of revolutions so that high speeds cause this number of revolutions to be used up at a relatively high rate correspondingly shortening the life of rolling element bearings. A combination of hydrodynamic and hydrostatic bearings to support a high speed spindle is disclosed in U.S. Pat. No. 5,462,364, wherein the hydrodynamic bearings are effective at high speed rotation, and the hydrostatic bearings are effective at low speed rotations of the spindle. Fluid hydrodynamic and hydrostatic bearings can generally deliver substantially greater performance than conventional rolling element bearings; specifically, these fluid bearings are insensitive to surface imperfections in the bearing, they normally will not wear over time, they have a large load capacity, and they are substantially immune to momentary overloads which could cause rolling element bearings to indent and cause pitting in bearing surfaces.

In hydrodynamic bearing spindles, the stiffness varies as the speed varies; while in typical hydrostatic bearings, hydraulic oil under pressure provides a more uniform stiffness. Thus, the position of the spindle in relation to the fixed bearing member is independent of the rotary speed of the spindle shaft supported by hydrostatic bearings as long as the maximum permissible bearing load value as determined by the pumping pressure and bearing configuration is not attained so that no contact will take place between the spindle shaft and fixed bearing. Despite these advantages, the use of oil under pressure in the bearings presents problems in terms of sealing of the bearing fluid in the spindle so that it does not mix with cutting fluids, particularly at high speeds where use of seals in contact with rapidly rotating parts can tend to wear thus losing their sealing ability. Many cutting fluids are water-oil emulsions and any contamination of the cutting fluid with incompatible fluids such as hydraulic oils for hydrostatic bearings can cause problems ranging from creating excessive variation in workpiece finish or dimensions to shortening of tool life. Sealing problems can be exacerbated where the spindle is used in a nutator type machine tool with the spindle changing attitudes with respect to the horizontal so as to increase the effects of gravitational forces on the bearing fluid tending to draw it out from the spindle when the spindle tilts. Accordingly, there is a need for a cutting spindle and motor apparatus that maintains a relatively constant stiffness and load capacity at low cutting speeds and at high cutting speeds, e.g., 20,000 rpms or more. For such a spindle and motor apparatus, a spindle sealing system is needed which prevents significant leakage of oil from fluid bearings in the spindle to the cutting fluid at the machining area at high operating speeds of the machine tool and when the spindle is stationary.

Hydrostatic bearings are commonly designed with circumferentially spaced pockets into which fluid under pressure is fed. The pockets are surrounded by a land or sill area, and typically a drain groove is formed in the sill area between adjacent pockets. One problem that has been found with hydrostatic fluid bearings run at high rotary speeds is the lowering of the fluid pressure in the pockets reducing the load bearing capacity of the hydrostatic bearings. It is believed that this reduction of the bearings load bearing capacity is due to reduction in viscosity of oil because of increased turbulence and fluid friction generated in the bearing pockets at high rotary speeds causing energy losses and lowering of fluid pressure in the pockets. Above certain high rpms of spindle rotation, the so-called "viscous pumping action" of the bearing fluid becomes predominant, and oil in the pocket is pumped out in considerable quantities; and in the absence of replenishing oil, the pocket pressure is reduced, thereby drastically affecting the hydrostatic capacity of the fluid bearings, which is undesirable.

In this regard, it is important to maintain certain minimum clearances in the bearings to keep their load bearing capacity sufficient for the increased loads experienced at the high rotary speeds at which the present spindle can be run. In addition to viscous pumping of bearing fluid, where high temperatures cause thermal expansion of the spindle, the clearances preset into fixed bearings may be decreased past their minimum tolerances necessary for proper load bearing capacity, and machining errors due to the thermal deformation of the spindle components can occur.

SUMMARY OF THE INVENTION

In accordance with the present invention, an integrated spindle and motor unit of a machine tool is provided to have a large cutting speed range with the stiffness and load capacity remaining satisfactory. The integrated spindle and motor unit includes hydrostatic fluid bearings to provide the unit with increased stiffness for improved cutting accuracy when cutting within the full range of speeds at which the present spindle unit is designed to be run. In the preferred form of the invention, a spindle shaft is mounted in a housing frame for rotation at speeds of up to 20,000 revolutions per minute ("rpms") or greater with a first motor portion provided on the spindle shaft between the ends thereof and a second motor portion on the frame which cooperates with the first motor portion for rotary driving of the spindle shaft. The preferred embodiment will operate at speeds to 20,000 rpms, while other smaller designs could operate at speeds up to 40,000 rpms. Hydrostatic bearings are formed adjacent the ends of the shaft and have high pressure fluid supplied thereto to support the shaft in the frame for rotary driving thereof. By utilizing hydrostatic bearings, the present spindle provides a substantially uniform rigidity or stiffness and load bearing capacity over its entire operating range. In addition, because the motor is integrated with the spindle with a portion thereof on the spindle shaft, there are no power losses attributable to power transmission gears or belts as with conventional spindle motors.

In order to maintain the stiffness at speeds of about 20,000 rpms without resonant vibrations, the span between the hydrostatic bearings has to be short. In order to achieve high power, e.g., 100 hp in such a short span, the motor for the integrated spindle and motor unit is a permanent magnet motor with the second motor portion being a stator secured in the frame, and the first motor portion being a rotor including permanent magnets mounted on the spindle shaft rotatable in the frame. The permanent magnet motor herein provides increased power over conventional induction motors which utilize transmission gears and/or belts in which power can be lost. Thus, the present integrated spindle and motor unit is capable of both high speed operation, i.e., up to 20,000 rpms, while providing increased power at the tool head. Thus, not only can the present spindle be run at high speeds, heavy and deep cuts for removing large amounts of metal with each cut can also be performed with the increased power capabilities.

Another advantageous feature, particularly in assembly of the permanent magnet motor in the spindle and motor unit herein, is that the rotor including the permanent magnets is mounted on the spindle shaft with a shrink fit connection to provide a tight, secure attachment between the shaft and rotor during high speed rotation of the shaft. High pressure hydraulic fluid is fed into fluid passageways or conduits formed in the rotor body to expand the bore so that the rotor can be properly positioned on the shaft relative to the stator mounted to the spindle frame. When the rotor is in position on the shaft, the fluid pressure can be removed to allow the expanded rotor bore to shrink and grip tightly onto the spindle shaft for high speed rotation therewith. In addition, designing the rotor for expansion advantageously allows it to more readily accommodate for thermal expansion of the spindle shaft during high speed cutting operations.

The integrated spindle and motor unit preferably utilizes seals that are in non-contacting spaced relation with the spindle shaft for keeping the bearing fluid within the spindle and away from the cutting tool during cutting operations. As previously mentioned, the use of hydraulic oil in the fluid bearings can present problems if such fluid leaks from the spindle to the tool/workpiece interface and contaminates the cutting fluid, which is typically a water-based solution. Moreover, at high cutting speeds, conventional contacting-type seals will tend to wear, allowing leakage therethrough. In the present integrated spindle and motor unit, the seals are non-contacting type seals, thus obviating the wearing problem experienced by conventional contacting seals at high speeds.

Preferably, the seals include labyrinth seals at the forward and rearward ends of the shaft adjacent the bearings. The labyrinth seals define a tortuous path through which the bearing fluid must travel to leak therethrough. Aerostatic floating ring seals can be provided adjacent to and outwardly from the labyrinth seals on the spindle shaft with the labyrinth seals being between the floating ring seals and the bearings along the spindle shaft. The floating ring seals are provided with high pressure air for forming an air barrier between the shaft and the ring seals to keep bearing fluid that may leak through the labyrinth seals in the spindle. In this manner, the seals herein are effective to keep bearing fluid from leaking out of the spindle without requiring contact with the spindle shaft which otherwise could be damaging to the seals, particularly at high speed rotation of the spindle. Thus, the present integrated spindle and motor unit has a sealing system which prevents the bearing fluid from leaking out of the spindle and gaining access to the cutting fluid even during high speed cutting operations, and when the spindle is tilted at various attitudes to the horizontal.

The floating ring seals can include porous ring bodies which are mounted at the forward and rearward ends of the spindle shaft in spaced relation thereto and which are provided with high pressure air which forms an air barrier between the shaft and ring seal bodies and for percolating air through the pores of the ring bodies to limit bearing fluid leakage therethrough.

In a preferred form, the spindle shaft includes inclined surfaces at its forward and rearward ends and the hydrostatic bearings are on the spindle shaft inclined surfaces to take both axial and radial loads.

At least one of the bearing members, preferably the rear conical bearing member, is mounted on the spindle housing by a shiftable bearing mount so that when the spindle is running, the effects of thermal expansion on the spindle are minimized by allowing the bearing member to shift to keep clearances between the confronting bearing and shaft surfaces at a distance which is sufficient to provide proper load bearing capacity in the hydrostatic bearings. In this manner, there are no excessive loads placed on the shaft which could damage the spindle due to surface clearances falling below acceptable tolerances when the metal of the spindle components undergoes expansion due to high temperatures generated during cutting operations, and the accuracy of the machining is maintained despite the expansion of the shaft at high temperatures. Preferably, the rear bearing member is spring-loaded with a spring force of approximately 3,000 lbs which is overcome by expansion of the spindle shaft with the bearing member sliding on roller elements to keep clearances above a certain minimum tolerance level to maintain proper load bearing capacity in the bearings.

The spindle shaft can include an axial bore extending therethrough with an enlarged tool holder receiving socket portion of the bore at the shaft forward end. A tool holder can be mounted in the enlarged socket portion and a tool changer is provided in the shaft bore for mounting the tool holder in the socket and to release the holder therefrom for changing tools on the spindle.

Preferably, a pressure fluid source provides fluid at pressures of at least 1200 psi to the hydrostatic bearings for providing the bearings with a high load bearing capacity. The motor can have a cavity that is supplied with slightly pressurized air to help keep bearing fluid from leaking into the motor cavity.

In accordance with a preferred embodiment of the invention, an integrated motorized spindle unit is provided in a machine tool for high speed cutting operations. The spindle unit includes a spindle shaft rotatable about a central axis extending through the shaft for rotating the cutting tool mounted thereto for high speed cutting of workpieces. A motor drives the spindle shaft at speeds of to 20,000 rpms. A housing for the spindle unit has the spindle shaft and motor mounted therein. Inclined bearing surfaces are formed on the shaft at an incline to the shaft rotational axis. Inclined surfaces are provided in the housing which face and cooperate with the shaft inclined surfaces to form hydrostatic bearings to take axial and radial loads. Oil is supplied at pressures of at least 1000 psi to the bearings to support the loads generated during rotary driving of the spindle shaft. A labyrinth seal is provided adjacent the bearing pocket and defines a tortuous path of travel therethrough to limit bearing fluid leakage through the labyrinth seal path. Floating ring seals are provided adjacent the labyrinth seals for preventing bearing fluid which may leak through the labyrinth seal from leaking out of the spindle unit, and specifically from the front of the spindle to the tool/workpiece interface.

Preferably, the motor has a power output capacity rated at about 135 horsepower with about at least 100 horsepower at the cutting tool for cutting due to fluid frictional losses in the bearings. In this manner, the integrated motorized spindle unit allows for both extremely fast and heavy cutting operations to be performed on a workpiece without fear of overloading the spindle because of a lack of sufficient power at the tool head.

The spindle shaft can have a proximate portion adjacent the forward end of the spindle shaft where the cutting tool is carried and a distal portion axially spaced a predetermined distance rearward from the forward proximate portion. The hydrostatic bearings are formed around the shaft proximate portion and the shaft distal portion. Preferably, the motor includes a first motor part on the spindle shaft between the proximate and distal portions and a second motor part on the housing cooperating with the first motor part to rotate the spindle shaft at speeds of up to 20,000 revolutions. The predetermined distance between the spindle shaft portions is sufficiently short so that the spindle shaft has a dynamic stiffness that is sufficient to avoid the onset of high speed resonant shaft vibrations during shaft driving between start-up and up to 20,000 rpms. The motor can be a permanent magnet motor with the second motor part being a stator and the first motor part being a rotor including permanent magnets secured to the rotor. The motor can have a power output capacity rated at least 135 horsepower with the bearings on the shaft proximate portion and the shaft distal portion being spaced apart at a distance less than 16 inches. The spindle unit herein is relatively small and compact with the hydrostatic bearings closely, axially spaced along the spindle shaft so as to provide a very rigid and stiff spindle for accurate cutting operations at high rotary speeds.

In another form of the invention, a spindle unit including hydrostatic bearing members is provided with the bearing members including high pressure bearing pockets around the spindle shaft to receive high pressure oil for supporting the shaft for rotation, and low pressure pockets between the high pressure bearing pockets to receive low pressure oil therein. The low pressure pockets are kept full with low pressure oil during spindle operation so that the viscous pumping action of fluid in the bearing pockets back against the rotary direction of the spindle will not adversely affect the fluid pressure in the bearing pockets. Thus, the present spindle unit including the low pressure pockets operates reliably with proper bearing pressure even at high rotary speeds which would otherwise tend to adversely affect the load bearing capacity of the hydrostatic bearings due to viscous pumping of the bearing fluid in the bearing pockets.

DETAILED DESCRIPTION OF THE PREFERRED EMBODIMENT

Figure 1:
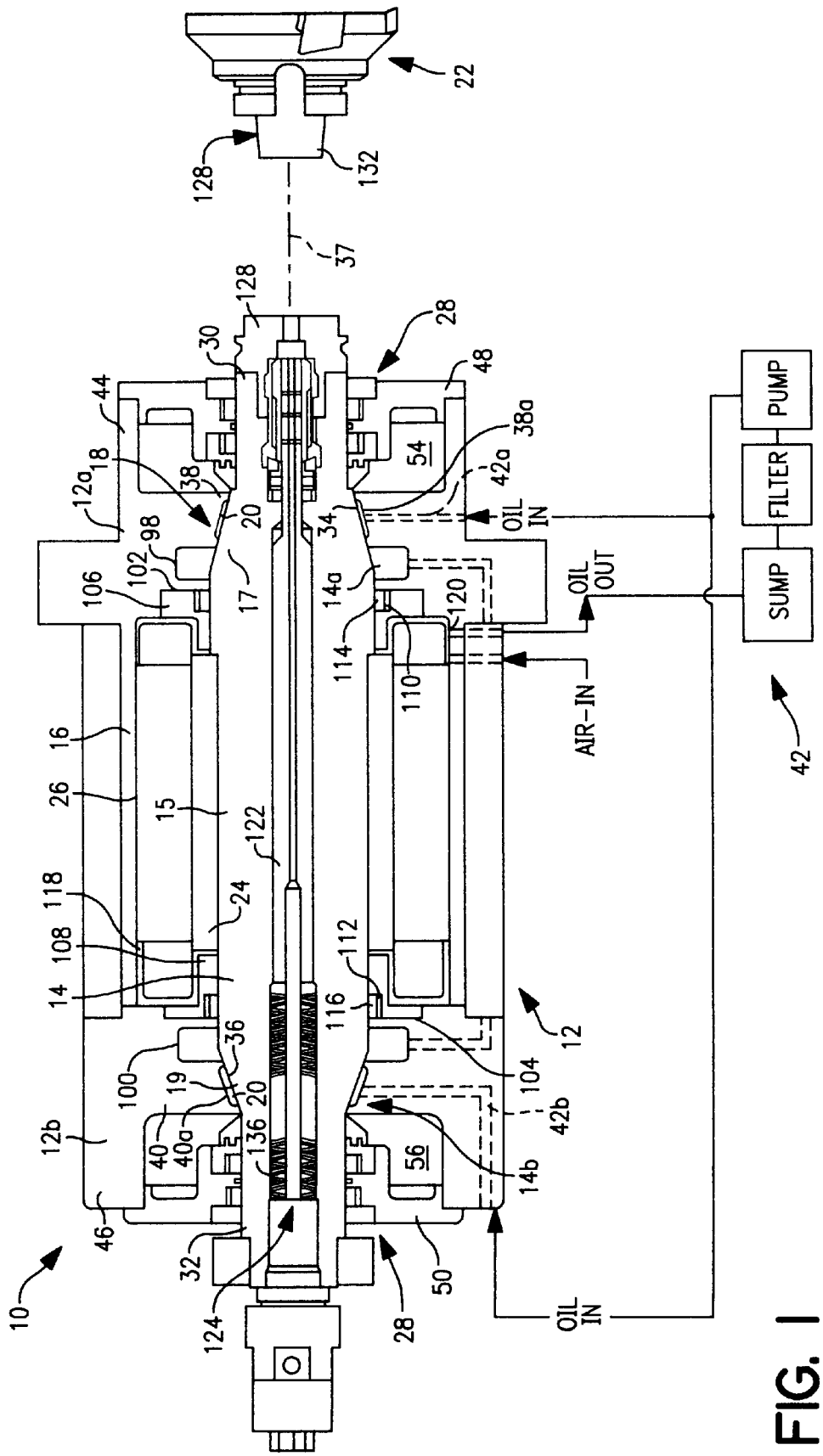
FIG. 1 is a schematic view of an integrated spindle and motor unit for a machine tool in accordance with present invention showing a spindle shaft and motor in a housing frame.

In FIG. 1, an integrated spindle and motor unit according to the present invention is schematically shown and generally designated with the reference numeral 10. The integrated spindle and motor unit 10 includes a stationary housing 12 in which a spindle shaft 14 is driven for rotary motion by a motor 16 which is also mounted in the housing 12 about the spindle shaft. The spindle shaft 14 can be driven at speeds of up to 20,000 revolutions per minute and is supported in a stiff manner by hydrostatic bearings, generally designated 18, formed around the spindle shaft 14 in the housing 12.

More specifically, the spindle shaft 14 has hydrostatic bearing pads 20 around both its forward end 14a and its rearward end 14b. Preferably, four equally spaced pads 20 are formed around both the forward end 14a and rearward end 14b of the shaft 14. The axial distance between the front and rear bearing pads 20 is relatively short so that the spindle shaft 14 is mounted in a rigid manner in the housing 12 with high levels of dynamic stiffness even when driven by motor 16 for high speed rotation thereof. In addition, the total length of the spindle shaft 14, including the portions thereof projecting beyond the bearings 18, is relatively short. Thus, the short spindle 14 having a short axial distance between front and rear bearing pads 20 increases the critical speed threshold at which the spindle must be driven before resonant vibrations will occur which, in this instance, will be at some speed over 20,000 rpms. In this illustrated embodiment of the invention, the span between the center of the respective bearings 18 is about 16 inches for a 100 horsepower motor. Manifestly, this distance and power are by way of illustration and not limitation. That is, the bearing pads 20 at the shaft forward end 14a proximate the mounting of the cutting tool 22 thereat, as will be more fully discussed hereinafter, are 16 inches axially spaced from the bearing pads 20 at the shaft rearward end 14b distal from the cutting tool 22. Thus, by the provision of close axial spacing between hydrostatic bearing pads 20 at the front and rear of the relatively compact integrated spindle and motor unit 10 herein, high cutting speeds and loads can be handled while still providing for accurate cuts on workpieces as resonant vibrations of the spindle shaft 14 are avoided.

The motor 16 is preferably a permanent magnet motor wherein the motor 16 includes a stator portion 26 mounted on the stationary housing 12 and a rotor portion 24 mounted on the spindle shaft 14 which also includes the permanent magnets. As previously mentioned, to increase the critical speed of the spindle shaft 14, the shaft is designed to be relatively short which also determines the length of the rotor 24 which can be provided on the shaft 14 in the integrated design herein. Accordingly, the motor 16 must be capable of providing a lot of power in a short span which gives the present spindle unit 10 increased power capabilities over current spindles which utilize induction motors. Herein, the 100 horsepower motor has an axial length of 9 inches, and the stator is about 9 inches in diameter. The actual motor appears to be more square in cross-section than that depicted in the drawings of this application. The permanent magnet motor 16 herein avoids the use of the transmission belts and gears of prior induction motors and the attendant power losses therein. In addition, the permanent magnet motor 16 is able to deliver higher levels of horsepower at the tool head in a shorter span than conventional induction motors. The permanent magnet motor is preferred even though it is more costly than a comparable induction motor. Thus, the present compact high speed spindle unit 10, in addition to having higher speed capabilities and improved stiffness, also has increased horsepower capacity so as to provide greater flexibility in the various types of cutting operations that can be performed e.g., roughing and finishing cuts such as in drilling and boring operations, and the efficiency in performing these different types of machining operations.

Figure 5:
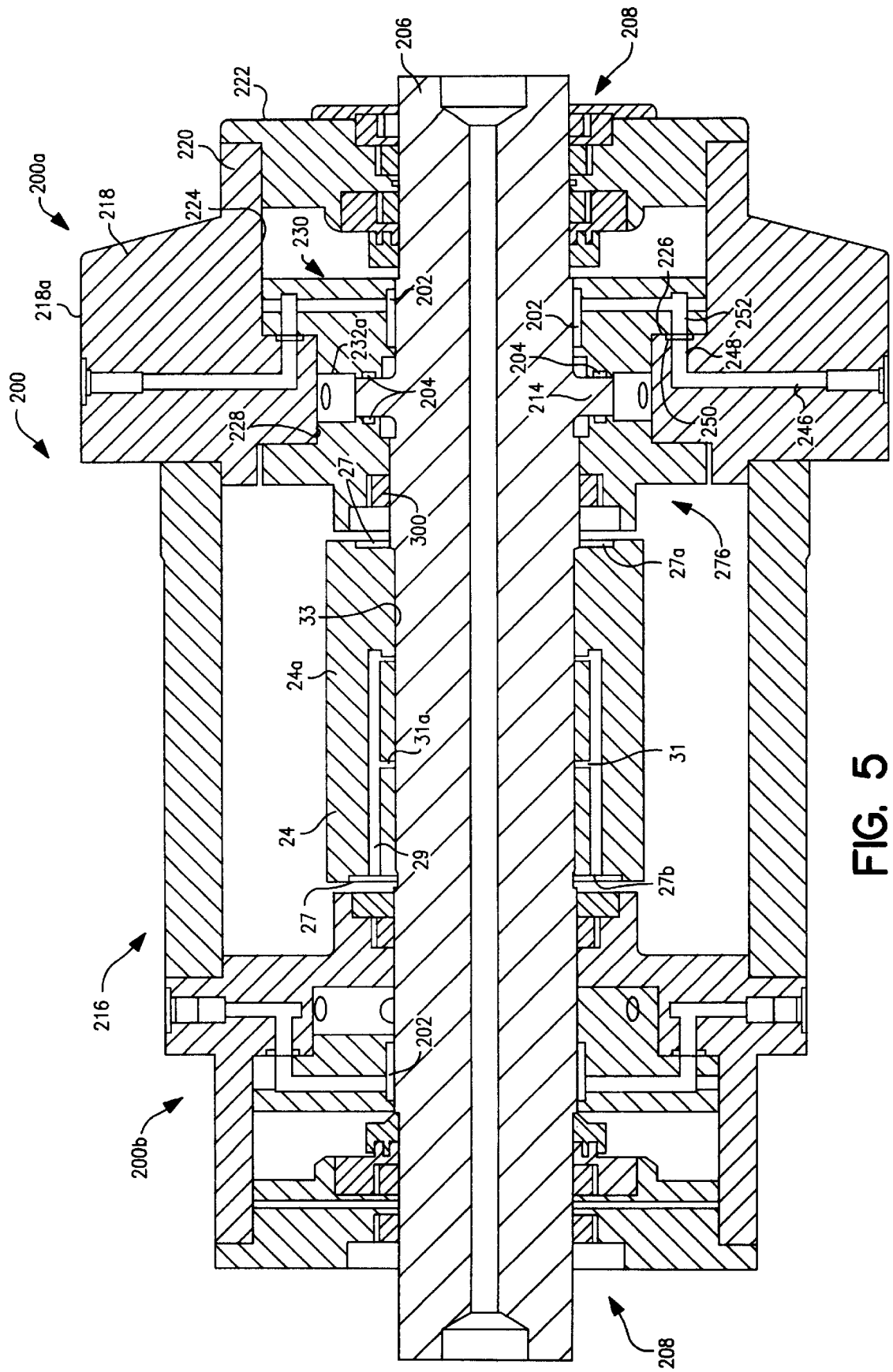
FIG. 5 is a sectional view taken along line 5—5 of FIG. 4 of the alternative spindle and motor unit showing a rotor of the motor including hydraulic fluid passageways for shrink fitting the rotor on the spindle shaft.

It is preferred that the rotor 24 has an elongate annular body 24a which is provided with a shrink fit connection on the spindle shaft as shown with respect to alternative spindle and motor unit 200 in FIG. 5. The rotor body portion 24a as used in the spindle and motor unit 200 includes annular recesses 27 formed in the front and rear faces thereof with the bottom recessed surface 27a of the front annular recess being abutted against a shoulder formed on the spindle shaft to locate the rotor portion 24 in proper axial position thereon. Axial passageways 29 are formed in the rotor body 24a and extend longitudinally along the length of the body 24a opening at the bottom recessed surface 27b of the rear annular recess 27. Several longitudinal passageways 29 are circumferentially spaced around the rotor body 24a for feeding high pressure hydraulic fluid to short radial passageways 31 extending radially from the longitudinal passageways 29. Preferably, two axially spaced radial passageways 31 are provided for each longitudinal passageway 29. The passageways 31 extend radially to an opening at circular grooves 31a formed in the rotor body throughbore surface 33 which extend around the shaft and receive high pressure fluid from axially aligned radial passageways 31 to feed high pressure oil between the surfaces of the shaft and the rotor bore 33. In this manner, the body 24a of the rotor portion 24 can be expanded to allow it to be properly oriented on the spindle shaft relative to the stator portion 26 affixed to the housing frame 12. With the rotor body 24a properly oriented, the high pressure hydraulics are removed from the longitudinal passageways 29 allowing the rotor body 24a, and particularly the throughbore 33 thereof, to shrink onto the shaft surfaces for tightly and securely gripping the rotor portion 24 onto the shaft for rotation therewith. The expandable rotor body 24a also is advantageous in that when the spindle shaft undergoes thermal expansion, as during high speed operation thereof, the expandable rotor 24a can more readily accommodate the expansion of the spindle shaft without causing problems for the motor 16.

The bearings 18 for the spindle unit 10 will next be more specifically described. The spindle shaft 14 includes a main larger diameter central section 15 on which the motor rotor portion 24 is mounted with the shaft ends 14a and 14b being on either side thereof. The ends 14a and 14b of the spindle shaft include conical sections 17 and 19 which taper down to respective front and rear smaller diameter annular portions 30 and 32. The forward and rearward conical sections 17 and 19 include respective outer surfaces 34 and 36 which are inclined relative to the longitudinal axis 37 of the spindle shaft 14 about which the shaft rotates. Front housing portion 12a and rear housing portion 12b each include a radially inwardly projecting bearing portion 38 and 40 on which inclined surfaces 38a and 40a are provided adjacent to and facing respective inclined surfaces 34 and 36 on the spindle shaft 14. The inclined surfaces 34 and 36 of the spindle shaft 14 and the corresponding inclined surfaces 38a and 40a on the bearing portions 38 and 40 cooperate to form the hydrostatic bearing pads 20 for taking both radial and axial loads generated during rotary driving of the shaft 14 and machining operations with the spindle unit 10. The bearing pads 20 provide improved stiffness and a reduction in the number of moving parts over conventional contacting rolling element bearings which makes the present spindle unit 10 less prone to vibration, a serious limitation of spindles using just conventional bearings. Moreover, the hydrostatic bearing pads 20 provide a damping function unlike conventional bearings so that if the shaft 14 starts to vibrate, the fluid in the pads 20 will act to dissipate and damp vibration before it can build up to resonate. It has been found that with he hydrostatic bearings, the stiffness of the spindle unit 10 herein can range from approximately 750,000 lb/in. for short tool lengths, to approximately 350,000 lb/in. for larger tools.

As shown schematically in FIG. 1, the bearing pads 20 are fed pressurized oil by way of oil recirculation system, including bearing oil supply means, generally designated 42. The oil supply means 42 includes respective oil feed passageways 42a and 42b formed in the forward and rearward housing sections 12a and 12b for feeding oil from the supply means into the interior of the housing 12 to the bearing pads 20. Preferably, the oil supply means is capable of feeding oil pressurized to at least 1000 psi to the bearing pads 20 for supporting the increased loads which can be generated during high speed rotary driving of the spindle shaft 14. Even more preferably, the pressure range for the oil supplied to the bearing pads 20 is between 1200 to 1500 psi. As previously discussed, with hydrostatic bearings, the oil under pressure gives the bearings their load carrying capacity. Thus, with high pressure oil, the spindle shaft 14 herein is provided with increased load carrying capacity which is substantially constant throughout the range of rotary driving speeds from start-up up to 20,000 rpms as the load carrying capacity in hydrostatic bearings is independent of the rotary speed of the shaft 14. As long as the maximum permissible bearing load value is not attained, no contact will take place between the shaft 14 and housing bearing portions 38 and 40. In this manner, the load carrying capacity and stiffness of the spindle unit 10 remain high up to 20,000 rpms.

Figure 2:
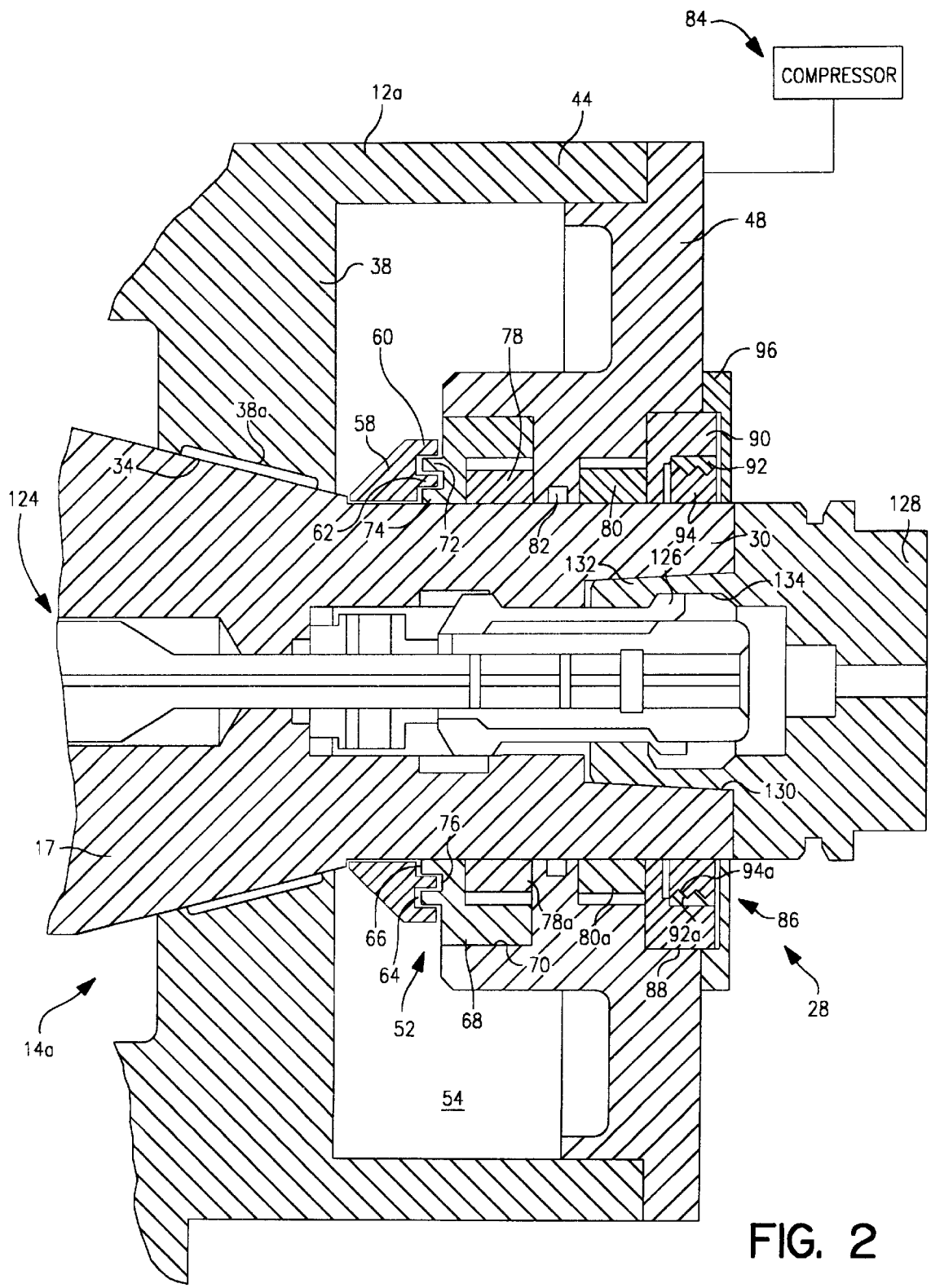
FIG. 2 is an enlarged sectional view of the forward end of the spindle shaft showing front hydrostatic bearings for the shaft and a sealing system for keeping bearing fluid from leaking out from the spindle unit.

Reference will next be made to FIG. 2 to describe the sealing system, generally designated 28, for the motorized spindle unit 10. FIG. 2 only shows the sealing system 28 that is provided at the front of the spindle shaft 14, whereas by reference to FIG. 1, it can be seen that the rear of the spindle shaft 14 is similarly sealed so that the description of the front sealing system 28 will apply equally to the rear sealing system with only minor differences therebetween. As a consequence of providing the hydrostatic bearings with hydraulic oil, it is important that there not be any leakage from the spindle unit 10 to the cutting fluid supplied to the tool/workpiece interface as the cutting fluid or coolant utilized in machining operations is typically a water-based water/oil emulsion which can be incompatible with the hydraulic oil used in the bearings. Thus, any leakage from the spindle unit 10 is to be avoided as contamination of the coolant with the oil bearing fluid can create problems in terms of the coolant's cooling and chip removal functions. The problem of bearing fluid leakage is exacerbated with the spindle unit 10 herein as conventional seals which contact the spindle shaft 14 would tend to wear at the high speeds at which the present spindle shaft 14 can be driven. Thus, the sealing system 28 herein utilizes non-contacting seals which are provided in spaced relation to the spindle shaft 14 and particularly the annular portions 30 and 32 thereof.

More particularly, the forward and rearward housing portions 12a and 12b each include axially extending ring sections 44 and 46, respectively. At the axially outer ends of the front and rear ring sections 44 and 46, respective front and rear cap members 48 and 50 are attached and to which the front and rear sealing systems 28 are mounted. For sealing the bearing oil in the spindle unit 10, three seals are provided at each end of the spindle with the first being a labyrinth seal 52 with very tight clearances between facing surfaces thereof. The labyrinth seals 52 are provided adjacent the bearing pads 20 in front and rear chambers 54 and 56 formed between the front and rear cap members 48 and 50 and the housing portions 12a and 12b, respectively, and specifically the respective ring sections 44 and 46 and bearing portions 38 and 40 thereof. The labyrinth seals 52 are very effective seals when the spindle shaft 14 is being rotated; but when rotation ceases, small amounts of bearing oil may leak through the labyrinth seals 52, and the remaining seals are effective to prevent leakage when the shaft 14 is not rotating.

The labyrinth seal 52 includes a conical portion 58 on the shaft annular portions 30 and 32 adjacent and immediately axially outward from the juncture of the annular portions 30 and 32 with the corresponding shaft conical sections 17 and 19. Thus, the labyrinth seals 52 are directly adjacent the bearing pads 20. The labyrinth seal conical portion 58 includes a pair of concentric annular rings 60 and 62 which cooperate to form an outer annular recess 64 therebetween. The inner annular ring 62 and the shaft nose portion 30 cooperate to form an inner annular recess 66 therebetween. A fixed labyrinth seal member 68 is attached in a rearwardly opening recess portion 70 of the cap member 48 and includes outer and inner concentric annular rings 72 and 74 which fit in corresponding outer and inner annular recesses 64 and 66 of the conical portion 58 with only slight clearances between the surfaces thereof. These clearance surfaces are preferably in the range of 0.005 to 0.010 inch with 0.005 being used in the embodiment described herein. The inner ring 74 is closely spaced from the shaft nose portion 30 and cooperates with the outer ring 72 to form an annular recess 76 in which the ring 62 projects. The conical portion outer annular ring 60 is closely spaced radially outward from the fixed seal member outer ring 72. As is apparent, by the closely interfitting arrangement between the annular rings 60 and 62 of the conical portion 58 and the annular rings 72 and 74 of the fixed seal member 68, a tortuous pathway is provided which limits any oil passage therethrough during rotary motion of the spindle shaft 14. Thus, for oil to leak from the bearing pads 20 out of the spindle 10, the oil must first traverse the tortuous path formed by the labyrinth seals 52.

To ensure that any small amounts of oil that leaks through the labyrinth seals 52 does not leak out of the spindle 10 particularly when the shaft 14 is not rotating, a pair of annular floating ring seals 78 and 80 are provided axially outwardly from the labyrinth seals 54 on each the shaft portions 30 and 32. The ring seals 78 and 80 are termed floating ring seals because they do not contact the spindle shaft 14 and float on a layer of air pressure, as more fully described herein. A drain groove 82 is formed in the cap member 48 adjacent the shaft nose portion 30 between the ring seals 78 and 80. Any small amounts of oil that may leak through the inner ring seal 78 will be sucked out and drained from the spindle 10 by way of drain groove 82 as by a vacuum applied thereto. Any remaining oil will be blocked from leaking from the spindle 10 by outer ring seal 80. In this manner, the sealing system 28 herein prevents fluid leakage from the bearing pads 20 to the exterior of the spindle unit 10, particularly to the cutting fluid at the tool/workpiece interface.

Figure 7:
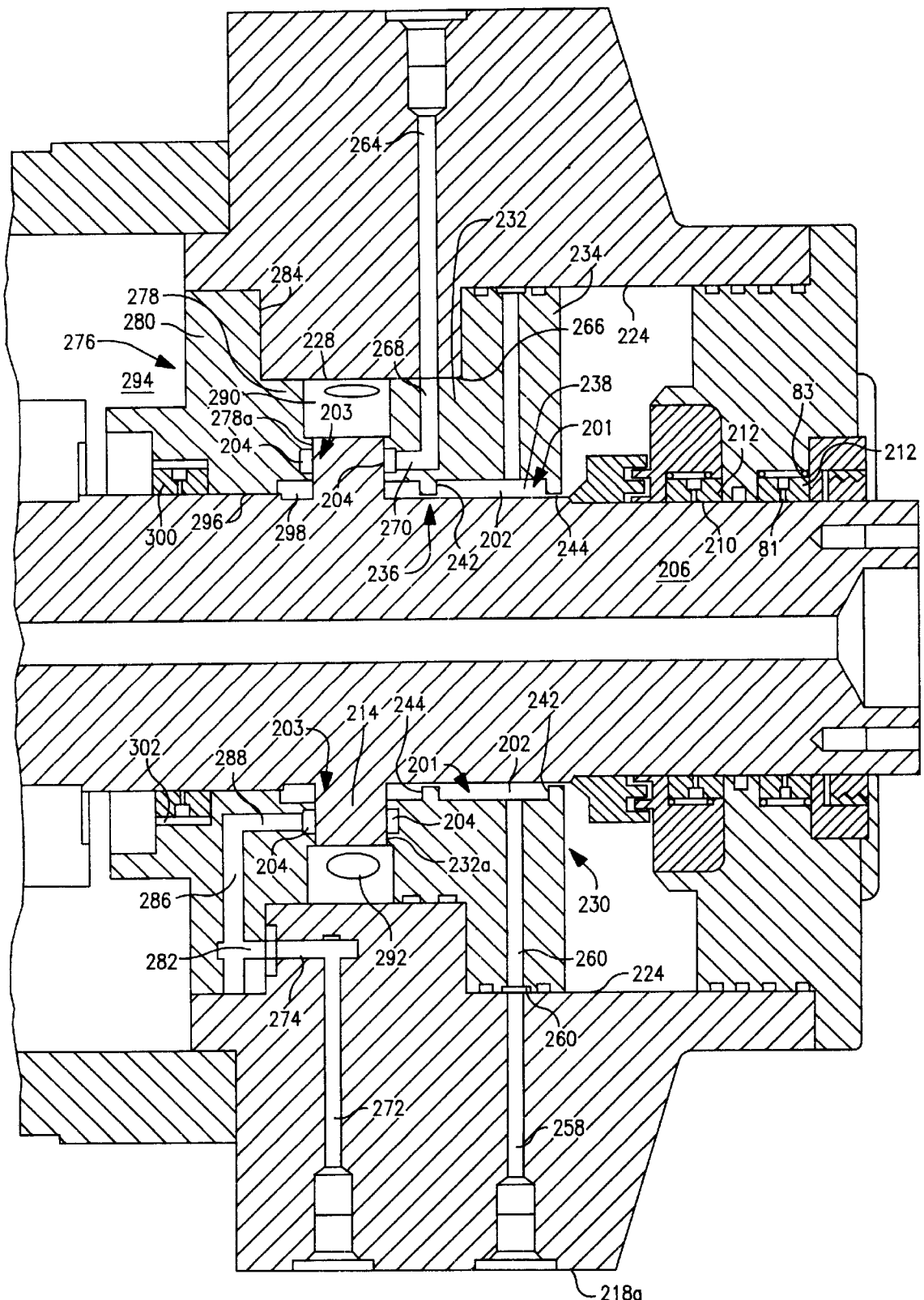
FIG. 7 is an enlarged sectional view taken along line 6—6 of FIG. 6 of the front portion of the alternative spindle and motor unit showing a sealing system for the rotary and thrust bearings substantially similar to the sealing system of FIG. 2.
Figure 8:
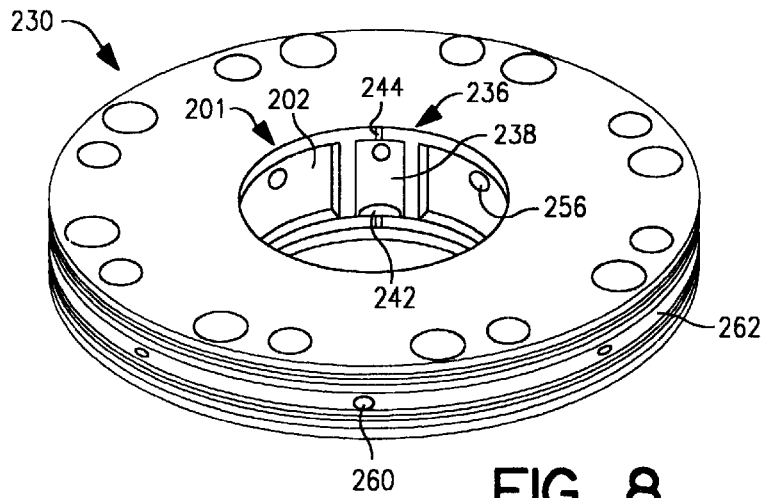
FIG. 8 is a perspective view of one of the bearing members showing radial bearing pockets and low pressure pockets between the radial bearing pockets.
Figure 9:
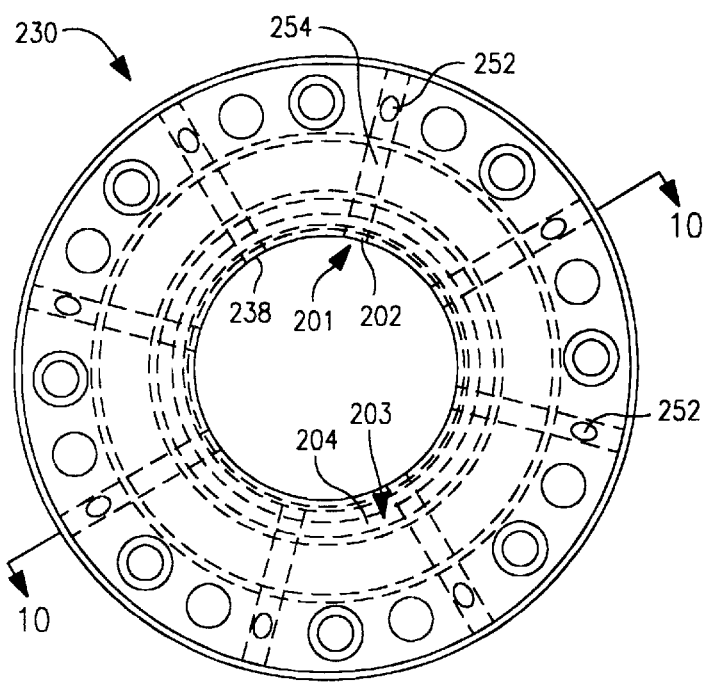
FIG. 9 is an elevational view of the bearing member of FIG. 8 showing the bearing fluid conduits in the bearing member in ghost.
Figure 10:
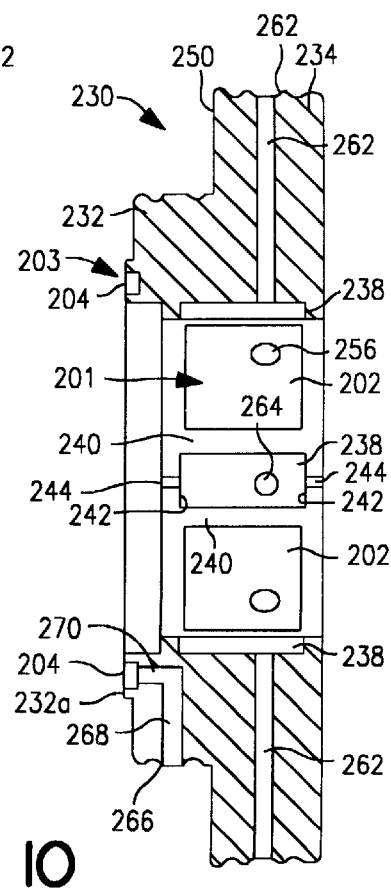
FIG. 10 is a sectional view of the bearing member of FIGS. 8 and 9 taken along line 10—10 of FIG. 9.

The ring seals 78 and 80 are provided with high pressure air from air supply means in the form of air compressor 84, shown schematically in FIG. 2. The air from compressor 84 will form a high pressure layer of air, preferably between 40 to 80 psi, at the interface between the seals 78 and 80 and the spindle nose portion 30. The floating ring seals 78 and 80 have an extremely close fit between the floating ring seals 78 and 80 and the adjacent surfaces of the cap member 48 in a range of about 0.0005 to 0.001 inch. The high pressure air is admitted into the chamber surrounding the outer circumferential surface of bodies 78a and 80a of respective floating rings 78 and 80. They can be porous members or several holes 81 can be drilled radially therearound to form an aerostatic film between the spindle and the floating rings, as shown in FIG. 7 in the alternative spindle and motor unit 200 which will be more fully described hereinafter. O-rings 83 can be added to both the sides of the floating rings to improve the effectiveness of the aerostatic seal. The pores or alternatively the holes 81 act as restrictors to form an aerostatic film between the inner circumferential surface of the floating ring and the outer circumferential surface of the spindle to prevent the oil leakage.

As mentioned previously, the labyrinth seal 52 and aerostatic floating ring seals 78 and 80 are also provided in similar relative orientation to each other on the rear shaft portion 32. However, the front nose portion 30 of the spindle shaft 14 also includes a front labyrinth seal 86 which keeps the cutting fluid at the tool/workpiece interface from accessing the interior of the spindle unit 10. More specifically, the cap member 48 can include a forward opening recess 88 in which an annular seal mounting member 90 is attached. Secured to the seal mounting member 90 is an outer annular fixed portion 92 of the labyrinth seal 86, including radially projecting teeth 92a. Rotating seal portion 94 of the labyrinth seal 86 is provided on the shaft nose portion 30 and includes radially outward projecting teeth 94a which intermesh with the teeth 92a so as to create a tortuous path for sealing off cutting fluid from entering the spindle unit 10. A seal cover 96 is attached to the front face of the cap member 48 and protects the labyrinth seal 86 from work chips which are generated during machining operations.

On the other side of the bearing pads 20, front inner cavity 98 and rear inner cavity 100 are formed in respective housing portions 12a and 12b. Hydraulic bearing oil from the pads 20 which leaks axially inward into the cavities 98 and 100 is drained from these cavities and returned to the oil sump of the oil supply means 42 where it can be re-filtered and re-pumped back to the bearing pads 20 for recirculating hydraulic oil therethrough. Housing portions 12a and 12b include respective inwardly opening recesses 102 and 104 for mounting fixed seal mounting members 106 and 108, respectively. The seal mounting members 106 and 108 attached in their corresponding recesses 102 and 104 define ring seal chambers 110 and 112 in which floating ring seals 114 and 116 are provided. The floating ring seals 114 and 116 prevent bearing oil that is not drained from cavities 98 and 100 from leaking into motor cavity 118. In addition, the motor cavity can be provided with slightly pressurized air, such as in the range of 2 to 3 psi such as from a shop air source, to further limit leaking oil from entering the motor cavity 118. In addition, an oil drain 120 is provided in the motor cavity 118 which returns oil back to the sump of the oil supply means 42 so that if oil enters the cavity 118, the motor 16 will not be harmed and the oil will be removed therefrom.

The spindle shaft 14 is also provided with an axial bore 122 extending therethrough in which a conventional tool changer 124 is mounted. The tool changer includes gripping members 126 at the forward end thereof for gripping and securing a conventional HSK tool adapter 128 to the spindle shaft 14. The tool adapter 128 mounts the cutting tool 22 thereon as shown exploded out from the front of the spindle unit in FIG. 1. The axial bore 122 includes an enlarged diameter socket portion 130 at the forward end thereof which includes tapered walls for receiving a correspondingly tapered shank portion 132 of the tool adapter 128. The gripping members 126 of the tool changer 124 can be fit in a bore portion 134 of the adapter shank 132 with the tool changer 124 being operated to pull the adapter shank into the socket 130. Rear springs 136 hold the tool adapter 128 seated in the socket 130 of the spindle shaft 14 for rotation therewith.

Figure 3:
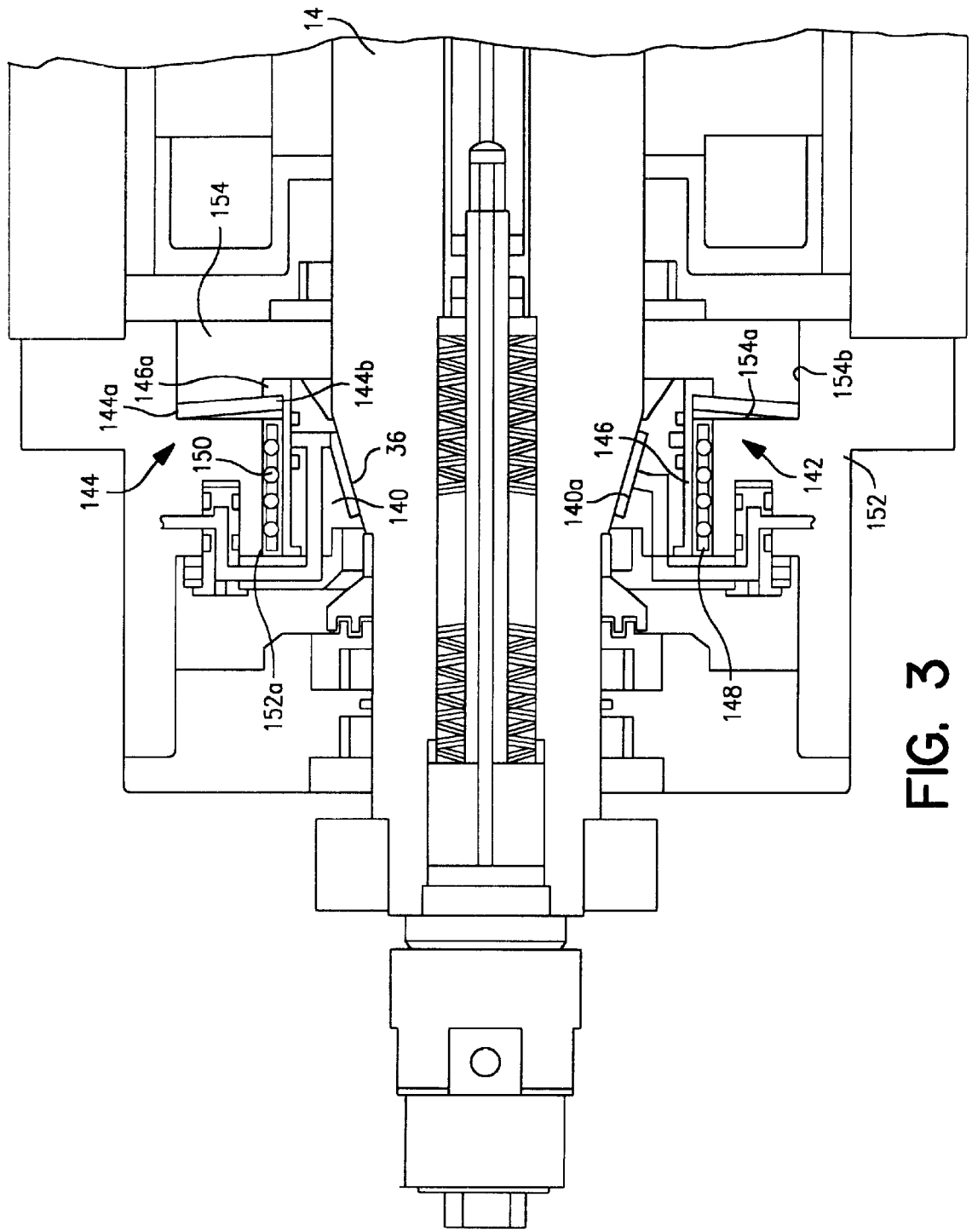
FIG. 3 is an enlarged view of the rear portion of the integrated spindle and motor unit showing a shiftable bearing mount between a rear flange portion of the spindle housing and a rear bearing member.
Figure 4:
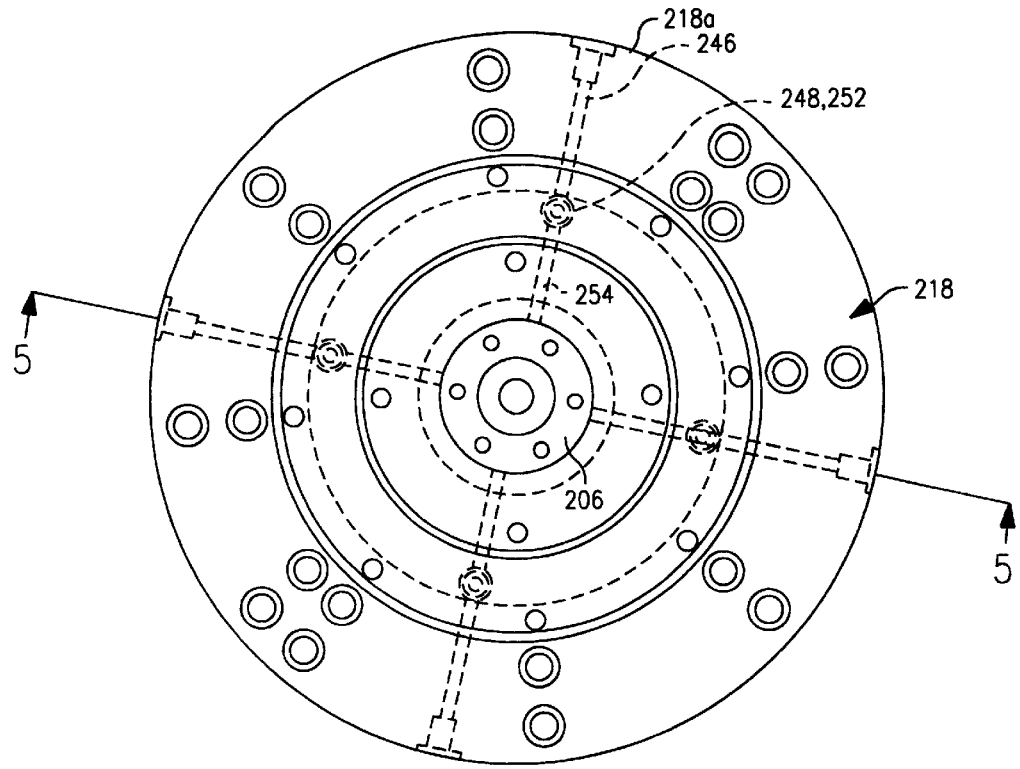
FIG. 4 is a front elevational view of an alternative spindle and motor unit in accordance with the present invention showing bearing fluid conduits in ghost for the radial bearing pockets.

Turning to FIG. 3, a modified version of the rear end of the spindle unit 10 for taking into account thermal expansion of the spindle shaft 14 is shown. The manner in which this is done is by providing the rear bearing member 140 with a shiftable bearing mount, generally designated 142, which allows for relative motion between the various portions of the rear of the housing 12 and the rear bearing member 140 during shaft expansion to keep the clearances between the confronting bearing surfaces within a certain predetermined distance below which the load bearing capacity of the rear bearing pads may be adversely affected, which, in this instance, may be clearances of approximately 0.0015 inch. Accordingly, any expansion of the shaft 14 that would otherwise cause the clearances to fall below the minimum clearance distance will cause the rear bearing member 140 to shift via the shiftable bearing mount 142 to track the expansion of the shaft keeping the clearances above the minimum set limit for maintaining the proper load bearing capacity in the hydrostatic bearing pads 20.

More specifically, the shiftable bearing mount 142 preferably includes an annular spring member 144 in the form of a Belleville spring having its inner diameter circumferential edge mounted against the radial flange portion 146a of bearing support member 146 having the rear bearing member 140 attached on its inner surface. The shiftable bearing mount 142 further includes a roller cage 148 for roller elements 150 which are in engagement with the outer surface of the bearing support 146, as can be seen in FIG. 3. The housing frame 12 can include a rear housing portion 152 including an interior circumferential surface 152a which is coaxial with the shaft axis 38 and which is disposed on the outer side of the roller cage 148 relative to the bearing support 146 and in engagement with the roller elements 150 thereof. The rear housing portion 152 includes an annular cutout 154 defined by vertical shoulder surface 154a which extends from the axially inner end of the interior surface 152a and radially outward to circumferential surface 154b which is coaxial with the shaft axis 38.

The Belleville spring member 144 has its radially outer edge 144a disposed at the corner juncture of the annular cutout surfaces 154a and 154b and its radially inner end 144b disposed against the bearing support flange 146a. The radially inner end of the spring member 144 is spaced axially inwardly from the radially outward end so as to provide the annular spring member 144 with a slightly inclined conical shape to bias the bearing support 146 and thus the rear bearing member 140 against the rear housing portion 152 when the shaft expands. The bearing support 146 extends longitudinally to a position axially inwardly of the cutout vertical shoulder 154a to provide sufficient clearance to receive the conical spring member 144 tightly between the flange 146a and the corner of the cutout 154. When the shaft 14 undergoes thermal expansion during high speed cutting operations, the clearances between the confronting inclined surfaces 36 on the spindle shaft 14 and 140a of the rear bearing member 140 can change slightly; however, with the shiftable bearing mount 142 herein, it is possible to maintain the clearances so that they do not drop below established tolerances for proper load bearing, such as on the order of approximately 0.0015 inch. Once the shaft 14 has expanded so that the spring bias force, which preferably is approximately 3,000 lbs, is overcome, the clearances will be reduced to the minimum tolerance and will be maintained at this clearance by tracking the expansion of the shaft due to shifting of the bearing member 140 and the associated bearing support 146 on the roller elements 150 with the bearing support flange 146a bearing against the radial inner portion of the spring member 144 and pushing it axially outward towards the vertical surface 154a of the rear housing portion 152. In this manner, the thermal expansion of the shaft 14 does not adversely affect the load bearing capacity of the hydrostatic bearings which is particularly important when the spindle is running at the high rotary speeds contemplated for the spindle herein, i.e., up to 20,000 rpms.

The alternative spindle and motor unit 200 of FIGS. 4–10 will next be described. The primary difference between the spindle and motor unit 200 over the previously described spindle and motor unit 10 is with respect to the configuration of the hydrostatic bearings as the spindle and motor unit 10 utilizes inclined surfaces to form the bearing pads 20 for taking both axial and radial loads of the spindle shaft 14 whereas the spindle and motor unit 200 utilizes separate radial bearings 201 and thrust bearings 203. The radial bearings 201 have pockets 202 and the thrust bearings 203 have grooves 204, respectively, to take the radial and axial loads of the spindle shaft 206. The permanent magnet motor for the unit 200 is a water cooled 135 horsepower motor. With the 135 horsepower motor, 100 horsepower is available at the tool head with power losses attributable to fluid friction in the bearings 18. The sealing system 28 of the spindle and motor unit 10 is substantially the same as the sealing system 208 of the spindle and motor unit 200. The main difference is that construction of the aerostatic floating ring seals 78 and 80 used a porous body, whereas the aerostatic floating rings 210 and 212 include radial passageways 81 drilled through the body instead of porous bodies. O-rings are disposed on either side of the rings for sealing purposes. The high pressure air is admitted into a chamber surrounding the floating rings 78, 80, 210 and 212 with the pores or the drilled holes acting as restrictors to form an aerostatic film between the inner circumferential surface of the floating ring and the outer circumferential surface of the spindle to prevent oil leakage. The floating rings 78, 80, 210 and 212 carry only their own weight and the aerostatic film floats the ring and keeps it concentric even with attitude changes. The bodies of the ring seals 210 and 212 can be of a carbon material so that even if there is some contact with the spindle shaft 206, there will be no damage to the shaft 206. In addition, the spindle and motor unit 200 is for use with a nutator type machine tool which changes attitudes such as between approximately 35° upwardly relative to the horizontal and 35° downwardly with respect to the horizontal. Accordingly, the effectiveness of the sealing system 208 takes on particular importance with the nutator type spindle and motor unit 200 herein. In this regard, it has been found that the use of the aerostatic floating ring seals 210 and 212 are especially well-suited to substantially prevent leakage of bearing fluid from the spindle 200 even when undergoing tilting because the aerostatic film will keep the floating rings concentric with the spindle shaft even though the nutator tilts the spindle substantially, e.g., through a 30° tilt.

As previously mentioned, the spindle and motor unit 200 includes distinct radial and thrust bearings 201 and 203 to take the radial and axial loads of the shaft 206. Radial bearing pockets 202 and thrust bearing grooves 204 are provided at the forward end 200a of the unit 200, whereas at the rearward end 200b only radial bearing pockets 202 are provided. In this regard, the spindle shaft 206 includes an annular thrust collar portion 214 adjacent the forward end of the shaft 206 which extends radially outward from the substantially constant smaller diameter remainder of the shaft 206. Thrust bearings 203 are provided on both sides of the annular thrust collar portion 214, as best seen in FIGS. 5 and 7. The radial bearings 201 have pockets 202 which are spaced circumferentially around the spindle shaft 206 axially forward of the thrust collar portion 214 and the thrust bearing grooves 204 extend therearound.

More particularly, the spindle and motor unit includes a housing frame 216 which includes a front flange portion 218 at the forward end 200a of the unit 200 with the flange portion 218 including an axially extending ring section 220. A front cap member 222 is attached at the forward end of the ring section 220, and the front sealing system 208 is mounted to interior surfaces of the cap member 222 similar to cap member 48 and sealing system 28 of the spindle unit 10. The flange portion 218 includes an inner circumferential bore surface 224 extending longitudinally rearwardly to vertical and radially inwardly extending wall surface 226 which, in turn, has stepped surface 228 extending longitudinally rearwardly therefrom parallel to the shaft axis with the stepped surface 228. The stepped surface has a diameter smaller than the diameter of the bore surface 224 by a distance corresponding to the distance through which the vertical wall surface 226 extends. The shaft thrust collar portion 214 is axially aligned with the housing portion stepped surface 228 and spaced radially inwardly therefrom.

A hydrostatic bearing member 230 having a small diameter portion 232 and a larger diameter flange portion 234 is mounted to the housing portion 218 with the outer diameter surface of the flange portion 234 against the bore surface 224 at the rear thereof and the small diameter portion 232 against the stepped surface 228, as best seen in FIGS. 5 and 7. The bearing member 230 includes an axial throughbore 236 for receiving the spindle shaft 206 therethrough. The radial bearing pockets 202 are formed in the surface of the throughbore 236 while one of the thrust bearing circumferential grooves 204 is formed in a radially inner slightly raised annular wall section 232a of the bearing member small diameter portion 232. Accordingly, the DN value (the product of the diameter of the bearings in millimeters and the maximum rotational speed of the spindle the bearings can support) of the thrust bearings 204 is higher based on its larger diameter of approximately 120 millimeters in the spindle unit 200 versus the approximate 85 millimeter diameter of the radial bearings 202. The radial bearings 202 have a maximum DN of approximately 1,700,000 and the thrust bearings 204 have a maximum DN of approximately 2,400,000 so that the majority of heat in the bearing fluid exiting the spindle unit 200 is derived from the thrust bearings 204.

Another feature of the radial bearings 201 of the present invention is the provision of low pressure pockets 238 (FIG. 10) between adjacent high pressure radial bearing pockets 202 to keep the pressure of the fluid in the bearing pockets 202 at a sufficiently high level for proper load bearing. This minimizes the negative effects of viscous pumping on the high pressure oil in the bearing pockets 202. As previously described, typically hydrostatic bearing pockets 202 are surrounded by sill areas, similar to the land or sill areas 240 of the surface of the throughbore 236 around the pockets 202, with exhaust grooves between the pockets 202 and extending axially for providing an constrained exit flow path for bearing fluid from the pockets 202.

To maintain sufficiently high fluid pressure in the bearing pockets 202 even during high speed operation of the spindle and motor unit 200 herein, the low pressure pockets 238 are supplied with hydraulic fluid or oil at low pressures to keep them full at all times during operation of the spindle unit 200, and instead of being formed as open-ended exhaust grooves. The pockets 238 include opposite end walls 242 at opposite ends of the pockets 238 with the end walls including small axially extending notches 244 which extend centrally from the ends of the pockets 238 to the edges of the sill area 240 for discharging oil from the pockets 238. The low pressure oil in the flow pockets 238 only serves to minimize the adverse effects of the viscous pumping action on the pressure in the radial bearing pockets 202. By providing the low pressure flow pockets 238 with end walls 242 and small notches 244 therein, oil will not freely flow from the flow pockets 238 out past the edges of the sill area 240. It has been found that the small notches 244 serve as pressure restrictors so as to add a certain amount of back pressure to the hydraulic system to keep the pressure in the bearing pockets 202 sufficiently high for proper load bearing capacity at high speed rotations of the spindle shaft 206 despite any viscous pumping action of the bearing fluid in the pockets 202.

To feed high pressure oil, e.g., 1200 to 1500 psi, to the radial bearing pockets 202 of the radial bearing, the housing flange portion 218 (FIGS. 4 and 5) includes radial and axial fluid supply conduits 246 and 248 with the radial conduits 246 extending radially from the flange portion large diameter outer surface 218a to the axial inner end of the axial conduits 248 which extend longitudinally outwardly and open at vertical wall surface 226 of the housing portion 218, as best seen in FIG. 5. The vertical wall surface 226 abuts against the annular surface 250 of the bearing flange portion 234 with the end of the axial conduits 248 aligned with openings to bearing member axial feed conduits 252 in the bearing flange portion 234. The bearing member axial conduits 252 extend from their openings on the inner annular surface 250 of the bearing member flange portion 234 to bearing member radial conduits 254 which extend radially inward and open at inlet ports 256 of the radial bearing pockets 202.

In the preferred form, the bearing member has four radial bearings 201 with their respective bearing pockets 202 equally spaced circumferentially around the bore 236. The bearing pockets 202 are supplied with high pressure oil through associated radial and axial supply conduits 246 and 248 in the bearing portion 218 and axial and radial feed conduits 252 and 254 in the bearing member 230 and into the centrally located inlet port 256 and out into the pockets 202. Accordingly, each bearing pocket 202 has a separate hydraulic line system in the spindle unit 200 for being fed with high pressure bearing fluid for bearing the loads of the shaft 206.

Figure 6:
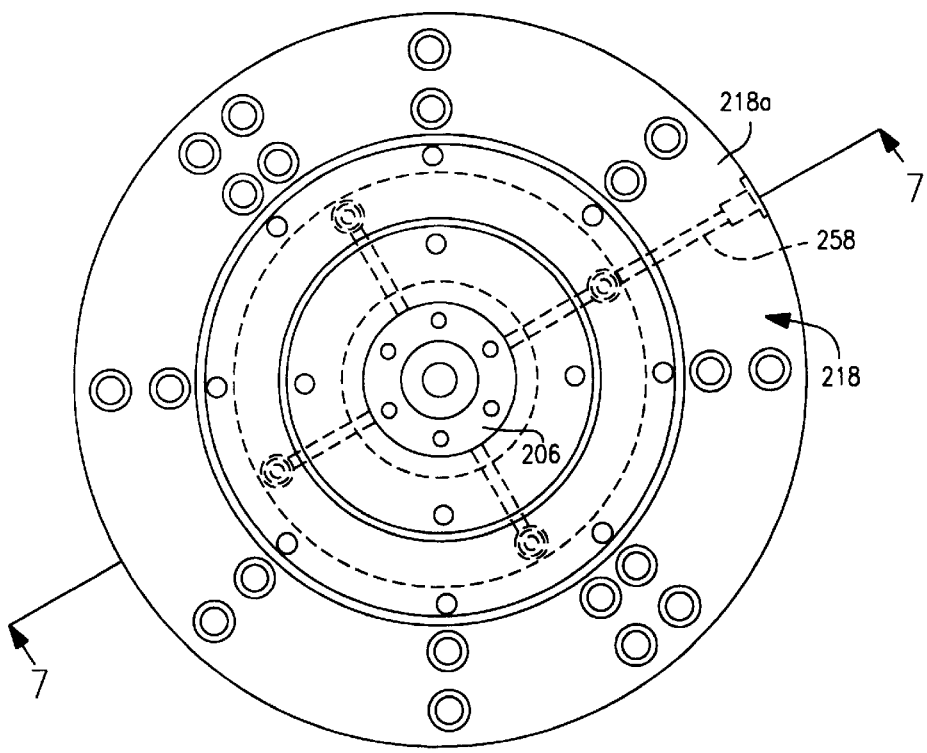
FIG. 6 is a front elevational view of the alternative spindle and motor unit similar to FIG. 4 including bearing fluid conduits in ghost for low pressure pockets between the radial bearing pockets.

To feed low pressure oil to the low pressure pockets 238, the bearing flange portion 218 includes a single radial supply conduit 258 (FIG. 7) which opens at the flange portion on the surface 218a and extends radially to the interior bore surface 224. Inlet openings 260 are formed in a circumferential groove 262 around the exterior of bearing flange portion 234 with the exit opening of the radial supply conduit 258 aligned with one of inlet openings 260, as shown in FIGS. 6 and 7. Radial feed conduits 262 extend from associated openings 260 in the flange groove 262 through the bearing member 230 to inlet ports 264 of the low pressure pockets 238. Thus, low pressure fluid is supplied by supply conduit 258 to groove 262. Fluid travels through the one aligned inlet opening 260 to its associated feed conduit 262 and to the remainder of the inlet openings 260 by flow in the groove 262 so as to feed low pressure fluid into the remaining feed conduits 262 and out from the ports 264 of the pockets 238. As the low pressure fluid is utilized only to keep the pockets 238 full for the reasons previously described, the precise control over fluid feed to each of the pockets 238 is not as critical as with the bearing pockets 202 where each pocket 202 is supplied with high pressure fluid by separate conduit systems formed in the housing portion 218 for load bearing purposes as opposed to the single supply conduit 258 for the low pressure fluid to keep the pockets 238 filled.

For feeding the thrust bearings 203 in bearing member raised portion 232a with high pressure oil, the housing portion 218 includes radial supply conduit 264 (FIG. 7) opening at the surface 218a and extending radially to the housing portion stepped surface 228. A shoulder surface 266 of the bearing member portion 232 abuts against the housing stepped surface 228 and has an inlet opening for a radial feed conduit 268 formed in the bearing member portion 232 aligned with supply conduit 264 and extending radially inward to axial feed conduit 270. The feed conduit 270 extends axially inwardly and opens at raised annular surface 232a of the bearing member portion 232 for directing bearing fluid into the circumferential thrust bearing groove 204 on the axially outer side of the shaft thrust collar 214.

The groove 204 on the axially inner side of thrust collar 214 is supplied with high pressure oil from radial supply conduit 272 spaced axially from pocket supply conduit 258 in the housing portion 218 and extending from surface 218a to axial supply conduit 274, as shown in FIG. 7. A thrust bearing member 276 is mounted to the rear interior end of the housing portion 218 and has a similar construction to bearing member 230 with a small diameter portion 278 and a larger diameter flange portion 280. The axial supply conduit 274 is aligned with axial feed conduit 282 which extends from annular surface 284 of the flange portion 280 longitudinally inwardly away from the shaft thrust collar 214 to radial feed conduit 286. The feed conduit 286 extends radially inwardly to another axial feed conduit 288 spaced radially inwardly from axial conduit 282 which redirects the fluid back towards the shaft thrust collar 214 and feeds bearing fluid to an inlet opening in the thrust bearing groove 204 formed in slightly raised annular section 278a of the bearing member portion 278. Accordingly, high pressure bearing fluid is fed into circumferential grooves 204 on both sides of shaft collar portion 214 for taking axially directed thrust loads of the shaft 206.

As previously mentioned, the shaft thrust collar portion 214 is spaced radially inwardly from the bearing stepped surface 228 to provide a drain area 290 from which oil is drawn out from the spindle unit 200 to be chilled, filtered and pumped under pressure into the bearings 201 and 203 for recirculation of the hydraulic fluid utilized in the spindle and motor unit 200 herein. The drain area 290 is bounded on either side thereof by the facing bearing member portions 232 and 278 and receives oil which exits axially inwardly from radial bearing pocket 202 and low pressure pockets 238 and radially outwardly from thrust bearing grooves 204 with the oil being sucked out of the area 290 through discharge openings 292.

Similar to the spindle unit 10, to keep bearing fluid away from the permanent magnet motor, the motor cavity 294 (FIG. 7) is provided with slightly pressurized air, at about 5 psi. The thrust bearing member 276 has an axial throughbore 296 with surfaces radially spaced from the shaft 206 extending therethrough to provide a small clearance therebetween for forming a capillary seal to keep bearing fluid from traveling axially inwardly from cavity 298 which is radially inward of the thrust bearing member raised section 278a. In addition, an aerostatic floating ring seal 300 is disposed in an axially inward opening recess 302 of the thrust bearing member 276 to prevent fluid leaking through the capillary seal from gaining access to the motor cavity 294.

Referring to FIG. 5, it can be seen that the rear end 200b of the spindle and motor unit 200 has a substantially similar construction to the front end 200a less the structure relating to the thrust bearings 204. Accordingly, there is no corresponding thrust collar portion on the rear end portion of the shaft 206 similar to thrust collar portion 214 on the front end portion of the shaft 206, but otherwise the radial bearings including their conduit systems are similar, and the sealing systems substantially correspond to each other, and accordingly will not be described in detail herein.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An integrated spindle and motor unit of a machine tool for rotating a cutting tool to cut workpieces, the spindle and motor unit comprising:

a housing frame;

a spindle shaft mounted in the housing frame for rotation having a rearward end and a forward end with the cutting tool mounted at the shaft forward end for performing cutting operations on workpieces;

a first motor portion on the spindle shaft between the ends thereof;

a second motor portion on the frame and cooperating with the first motor portion for rotary driving of the spindle shaft through a predetermined operating range of cutting speeds;

hydrostatic bearing members adjacent the shaft forward and rearward ends having high pressure bearing fluid supplied thereto to mount the spindle shaft in the frame for rotation through its operating range of speeds with a load bearing capacity that remains substantially constant; and non-contacting seals which do not engage the spindle shaft for retaining the bearing fluid about the rotating spindle and from leaking from the spindle unit.

2. An integrated spindle and motor unit of a machine tool for rotating a cutting tool to cut workpieces, the spindle and motor unit comprising:

a housing frame;

a spindle shaft mounted in the housing frame for rotation having a rearward end and a forward end with the cutting tool mounted at the shaft forward end for performing cutting operations on workpieces;

a first motor portion on the spindle shaft between the ends thereof;

a second motor portion on the frame and cooperating with the first motor portion for rotary driving of the spindle shaft;

hydrostatic bearing members adjacent the shaft forward and rearward ends having high pressure bearing fluid supplied thereto to mount the spindle shaft in the frame for rotation; and non-contacting seals for retaining the bearing fluid about the rotating spindle and from leaking from the spindle unit, wherein the non-contacting seals comprise a combination of labyrinth and aerostatic floating ring seals.

3. An integrated spindle and motor unit of a machine tool for rotating a cutting tool to cut workpieces, the spindle and motor unit comprising:

a housing frame;

a spindle shaft mounted in the housing frame for rotation having a rearward end and a forward end with the cutting tool mounted at the shaft forward end for performing cutting operations on workpieces;

a first motor portion on the spindle shaft between the ends thereof;

a second motor portion on the frame and cooperating with the first motor portion for rotary driving of the spindle shaft;

hydrostatic bearing members adjacent the shaft forward and rearward ends having high pressure bearing fluid supplied thereto to mount the spindle shaft in the frame for rotation; and non-contacting seals for retaining the bearing fluid about the rotating spindle and from leaking from the spindle unit, wherein the seals include labyrinth seals at the forward bearings and defining a tortuous path through which the bearing fluid must travel to leak therethrough, and aerostatic floating ring seals adjacent the labyrinth seals on the spindle shaft with the labyrinth seals being between the floating ring seals and the bearings along the spindle shaft, the floating ring seals being provided with high pressure air for forming an aerostatic film between the shaft.

4. The spindle and motor unit of claim 3 wherein the seals include air passages in the ring bodies mounted at the forward and rearward ends of the spindle shaft in spaced relation thereto and which are provided with high pressure air for forming the aerostatic film in a space between the shaft and ring seals and for air flow through the air passages into the space between the ring seals and the shaft.

5. The spindle and motor unit of claim 1 wherein the hydrostatic bearing members include high pressure bearing pockets spaced circumferentially around the shaft forward and rearward ends for supporting and taking the shaft loads during cutting operations, and low pressure pockets between the high pressure bearing pockets provided with fluid at a lower pressure than the bearing pockets with the low pressure pockets kept full with low pressure fluid for maintaining a high fluid pressure in the bearing pockets during high speed rotation of the spindle shaft.

6. An integrated spindle and motor unit of a machine tool for rotating a cutting tool to cut workpieces, the spindle and motor unit comprising:

a housing frame;

a spindle shaft mounted in the housing frame for rotation having a rearward end and a forward end with the cutting tool mounted at the shaft forward end for performing cutting operations on workpieces;

a first motor portion on the spindle shaft between the ends thereof;

a second motor portion on the frame and cooperating with the first motor portion for rotary driving of the spindle shaft;

hydrostatic bearing members adjacent the shaft forward and rearward ends having high pressure bearing fluid supplied thereto to mount the spindle shaft in the frame for rotation;

non-contacting seals for retaining the bearing fluid about the rotating spindle and from leaking from the spindle unit; and a shiftable bearing mount for the hydrostatic bearing members at one of the forward and rearward shaft ends to allow for shifting of the bearing member during workpiece cutting operations with the shaft undergoing thermal expansion for maintaining clearances between the bearing member and shaft surfaces sufficient for proper load bearing for the shaft at high rotary speeds thereof.

7. The spindle and motor unit of claim 1 wherein the motor is a permanent magnet motor with the second motor portion being a stator and the first motor portion being a rotor including permanent magnets secured to the rotor and an axial bore extending through the rotor for mounting on the spindle shaft.

8. The spindle and motor unit of claim 7 wherein a shrink fit connection is provided between the spindle shaft and the rotor bore mounted on the shaft.

9. The spindle and motor unit of claim 8 wherein a hydraulic conduit is provided in the rotor to receive high pressure hydraulic fluid to expand the rotor bore for mounting the rotor on the shaft.

10. The spindle and motor unit of claim 1 wherein the spindle shaft includes an inclined surface at one end and the hydrostatic bearings are on the spindle shaft inclined surface to take both axial and radial loads.

11. The spindle and motor unit of claim 1 wherein the spindle shaft has an axial bore extending therethrough with an enlarged tool holder receiving socket portion of the bore at the shaft forward end, a tool holder which can be mounted in the enlarged socket portion at the shaft forward end, and a tool gripper in the shaft bore with the gripper being operable to mount the holder in the socket and release the holder therefrom for changing cutting tools on the spindle.

12. The spindle and motor unit of claim 1 wherein a pressure fluid source provides fluid at pressures of at least 1000 psi to the hydrostatic bearings, and the motor has a cavity that is supplied with pressurized air to keep bearing fluid from leaking into the motor cavity.

13. An integrated motorized spindle unit in a machine tool for high speed cutting operations, the spindle unit comprising:

a spindle shaft rotatable about a central axis through the shaft for rotating a cutting tool mounted thereto for high speed cutting of workpieces;

a motor for driving the spindle shaft at high speeds;

a housing for the spindle unit in which the spindle shaft and motor are mounted;

hydrostatic bearings mounting the spindle shaft for rotation in the housing to take axial and radial loads;

bearing fluid supply means for feeding pressurized bearing fluid to the bearings to support the loads generated during rotary driving of the spindle shaft;

a labyrinth seal adjacent the bearings defining a tortuous path of travel therethrough to limit bearing fluid leakage through the labyrinth seal path during high speed rotation of the spindle shaft; and aerostatic floating ring seals adjacent the labyrinth seals for receiving pressurized air to form an air film in a space between the spindle shaft and the floating ring seals for preventing bearing fluid, which may leak through the labyrinth seal when the spindle shaft is not rotating, from leaking from the spindle unit.

14. The spindle unit of claim 13 wherein the floating ring seals include ring bodies formed with restricted air passageways therein; and air supply means for feeding high pressure air to the ring seals which flows through the restricted air passageways of the ring bodies to form an aerostatic film in the space between the ring seals and the spindle shaft to limit leakage of bearing fluid past the ring bodies and to keep the rings concentric with the spindle shaft.

15. The spindle unit of claim 13 wherein the hydrostatic bearings comprise conical surfaces on the shaft and on the housing.

16. The spindle unit of claim 13 wherein the motor includes a stator affixed to the housing and a rotor on the spindle shaft with the rotor including permanent magnets secured thereto.

17. The spindle unit of claim 16 wherein the rotor has an expandable bore and a hydraulic conduit system for application of high pressure hydraulic fluid to the bore to mount the rotor on the spindle shaft with the rotor bore being expanded by application of high pressure hydraulic fluid into the conduit system for orienting the rotor in proper position on the spindle shaft relative to the fixed stator and removing the high pressure hydraulics to allow the rotor to grip tightly onto the spindle shaft for rotation therewith.

18. The spindle unit of claim 13 wherein the motor has a power output capacity rated at at least one-hundred horse power.

19. The spindle unit of claim 13 wherein four hydrostatic bearing pockets are formed in surfaces around the spindle shaft.

20. The spindle unit of claim 19 including four low pressure pockets formed in the surfaces around the spindle shaft with the low pressure pockets being between the bearing pockets and kept full with low pressure fluid during cutting operations so as to maintain high fluid pressure in the bearing pockets when the spindle shaft is rotated at high speeds.

21. The spindle unit of claim 13 wherein the spindle shaft has a proximate portion adjacent the cutting tool and a distal portion axially spaced a predetermined distance from the proximate portion, and the hydrostatic bearings are positioned around the shaft proximate portion and the shaft distal portion.

22. The spindle unit of claim 21 including a shiftable bearing mount for the bearings at at least one of the shaft proximate and distal portions to allow for shifting of the bearing to track the thermal expansion of the spindle shaft during high speed cutting operations.

23. The spindle unit of claim 21 wherein the motor includes a first motor part on the spindle shaft between the proximate and distal portions thereof and a second motor part on the housing cooperating with the first motor part to rotate the spindle shaft at high speeds of up to 20,000 revolutions per minute with the predetermined distance between the spindle shaft portions being sufficiently small so as to avoid the onset of high speed resonant shaft vibrations during shaft driving between start-up and up to 20,000 revolutions per minute.

24. The spindle unit of claim 23 wherein the motor is a permanent magnet motor and the first motor part is a rotor and the second motor part is a stator including permanent magnets secured to the rotor.

25. The spindle unit of claim 23 wherein the motor has a power output capacity rated at at least one hundred horse power at the cutting tool and the hydrostatic bearings on the shaft proximate portion and the shaft distal portion are spaced apart at a distance less than 16 inches.

26. A spindle unit of a machine tool for high speed cutting operations, the spindle unit comprising:

a spindle housing;

a spindle shaft mounted in the housing for rotation for rotating a cutting tool to cut workpieces;

hydrostatic bearing members mounting the spindle shaft for rotation in the housing;

high pressure bearing pockets formed in the bearing members around the spindle shaft to receive high pressure bearing liquid to support the shaft during rotation thereof; and low pressure pockets formed in the bearing members around the spindle shaft circumferentially spaced from and between the bearing pockets to receive low pressure bearing liquid therein, the low pressure pockets being kept full with low pressure bearing liquid to maintain high fluid pressure in the bearing pockets during high speed rotation of the spindle shaft.

27. A spindle unit in accordance with claim 26 wherein the hydrostatic bearing members comprise radial bearings encircling the spindle shaft; and further comprising a thrust collar on the spindle shaft, and hydrostatic thrust bearings cooperating with the thrust collar to take thrust loads from the spindle shaft.

28. The spindle unit of claim 26 wherein the housing includes a motor cavity with an integrated motor in the housing cavity for driving the spindle shaft at high speeds, the motor including a stator fixed to the housing and a rotor having an expandable bore and a hydraulic conduit system for expanding the rotor bore upon application of high pressure hydraulic fluid into the rotor conduit system to orient the rotor on the shaft in a predetermined position relative to the stator and fixing the rotor in the predetermined position on the shaft by removing the high pressure hydraulics from the conduit system to allow the rotor to tightly grip onto the spindle shaft.

29. The spindle unit of claim 28 including seals in non-contacting spaced relation with the spindle shaft provided on either side of the motor cavity with the seals including ring bodies having air passageways which are supplied with pressurized air to form an air barrier between the ring bodies and the spindle shaft to keep bearing fluid from leaking into the motor cavity.

30. The spindle unit of claim 26 wherein the high pressure bearing pockets take radial loads of the spindle shaft, and at least one of the bearing members further include thrust bearing regions supplied with high pressure oil to take axial loads of the spindle shaft.

31. The spindle unit of claim 26 including seals in non-contacting spaced relation with the spindle shaft for keeping bearing fluid within the spindle unit and away from the cutting tool during cutting operations.

32. A spindle unit of a machine tool for high speed cutting operations, the spindle unit comprising:

a spindle housing;

a spindle shaft mounted in the housing for rotation for rotating a cutting tool to cut workpieces;

hydrostatic bearing members mounting the spindle shaft for rotation in the housing;

high pressure bearing pockets formed in the bearing members around the spindle shaft to receive high pressure bearing liquid to support the shaft during rotation thereof; and low pressure pockets formed in the bearing members around the spindle shaft between the bearing pockets to receive low pressure bearing liquid therein, the low pressure pockets being kept full with low pressure bearing liquid to maintain high fluid pressure in the bearing pockets during high speed rotation of the spindle shaft;

seals in non-contacting spaced relation with the spindle shaft for keeping bearing fluid within the spindle unit and away from the cutting tool during cutting operations; and labyrinth seals adjacent the bearings for forming a tortuous path through which the bearing fluid must travel to leak therethrough, and the non-contacting seals include aerostatic floating ring seals adjacent the labyrinth seals with the labyrinth seals being between the floating ring seals and the bearing along the spindle shaft, the floating ring seals being provided with pressurized air for forming an air barrier between the shaft and the ring seals to keep bearing fluid that has leaked through the labyrinth seals in the spindle housing.

\* \* \* \* \*